United States Patent
Kajander

Patent Number: 5,837,621
Date of Patent: Nov. 17, 1998

[54] FIRE RESISTANT GLASS FIBER MATS

[75] Inventor: Richard Emil Kajander, Toledo, Ohio

[73] Assignee: Johns Manville International, Inc., Denver, Colo.

[21] Appl. No.: 742,529

[22] Filed: Nov. 1, 1996

Related U.S. Application Data

[63] Continuation-in-part of Ser. No. 428,460, Apr. 25, 1995, abandoned.

[51] Int. Cl.$^6$ .............................. C03C 25/00; C03C 25/02
[52] U.S. Cl. ............................................. 442/143; 442/180
[58] Field of Search .................................... 428/375, 389; 442/143, 180

[56] References Cited

U.S. PATENT DOCUMENTS

| | | | |
|---|---|---|---|
| 2,990,307 | 6/1961 | Stalego | 162/165 |
| 3,218,279 | 11/1965 | Stalego | 524/157 |
| 3,653,952 | 4/1972 | Gagliardi | 442/180 |
| 3,854,988 | 12/1974 | Ashall et al. | 428/375 |
| 3,859,114 | 1/1975 | Pepper et al. | 427/299 |
| 3,970,422 | 7/1976 | Maeda et al. | 8/168 |
| 4,095,010 | 6/1978 | Zellar et al. | 428/375 |
| 4,112,174 | 9/1978 | Hannes et al. | 428/288 |
| 4,176,105 | 11/1979 | Miedaner | 428/36 |
| 4,235,950 | 11/1980 | Miedaner | 428/375 |
| 4,480,068 | 10/1984 | Santos et al. | 524/456 |
| 4,529,467 | 7/1985 | Ward et al. | 428/920 |
| 4,595,630 | 6/1986 | Fay | 442/180 |
| 5,391,213 | 2/1995 | Frovel | 65/17.3 |

*Primary Examiner*—Robert H. Harrison
*Attorney, Agent, or Firm*—Robert D. Touslee

[57] ABSTRACT

Fire resistant glass fiber products are produced by coating the glass fibers with at least one nitrogen containing compound and at least 10 weight percent of at least one boron containing compound, drying the glass fibers and curing a binder that is in the coating. The nitrogen containing compound(s) are present in sufficient amounts that there is at least one mol or atom of nitrogen present for each mol or atom of boron present in the boron containing compound(s). When the product is exposed to a fire or high temperatures, such as about 1000 degrees F. or higher, the nitrogen released from the nitrogen containing compound(s) reacts with boron or boron oxide to form a sheath of refractory material around the fibers that protects the fibers and allows the fibers to maintain integrity to higher temperatures and/or for longer times than untreated fibers.

18 Claims, No Drawings

FIRE RESISTANT GLASS FIBER MATS

This application is a continuation-in-part of U.S. Ser. No. 08/428,460, filed Apr. 25, 1995, now abandoned.

FIELD OF INVENTION

This invention involves a method of treating glass fiber, either individually or in the form of a fiber bundle, a nonwoven mat or a blanket of intermingled fibers with substances that when exposed to flames and/or high temperatures produces a refractory compound on the surface of the fibers which allows the fibers to maintain their integrity to much higher temperatures than untreated fibers. The invention also involves fiber, fiber products, nonwoven mats and insulation blankets so treated and an insulation blanket laminate having a nonwoven mat so treated in the interior or as a facing to allow the insulation laminate to be more fire-resistant, i. e. more resistant to melting and deteriorating when exposed to flames.

BACKGROUND

Fire-resistant materials are important in the fabrication of many building materials like doors, wall components, ceiling components, roof components, etc. In the event of a fire, fire resistant products protect the integrity of the building and its components for longer periods of time giving occupants longer to escape and giving firemen longer to get to strategic points to rescue people and to fight the fire. Of secondary importance is the reduced damage to contents of the buildings. Fire-resistance relates to the maximum temperature a material can endure without burning through or collapsing (loosing its integrity) or the time it takes at a certain high temperatures to burn through, collapse or otherwise destroy the integrity of a component. Codes have been established for many products which set forth high temperature performance they must meet to be considered fire rated or fire-resistant. Fire-resistance is thus distinguished from fire retardancy which is the ability of a material or component to withstand high temperature and time without catching on fire and burning.

Glass fibers and products made therefrom like insulation blankets and boards, woven fabrics and nonwoven mats are widely used in building products. Most homes and commercial and industrial buildings are thermally insulated with fiber glass insulation products in the form of bats, blankets, higher density boards, ceiling tile, etc. Most asphalt shingles have a fiber glass nonwoven mat as a base. Glass fiber is used in gypsum wall board to make the board fireproof. There are numerous other building products that use glass fiber and there are other opportunities if the glass fiber had a higher use temperature.

The majority of glass fiber products used in building products today are either sodium borosilicate glass having a softening point of as low as about 1290 degrees F. or E type borosilicate glass having a softening point as low as about 1529 degrees F. The softening points of these fiber products will vary some from manufacturer to manufacturer since slightly different glass compositions are used, but will be within a narrow range of about 10–40 degrees F. While more refractory glass fibers are known, like magnesia aluminosilicate S glass, the high cost of these types of fiber are prohibitive for all but a very few specialty building products.

As disclosed in U.S. Pat. No. 5,284,700, the disclosure of which is hereby incorporated by reference, it is known to treat or coat glass fibers with a phosphate containing compound to improve its fire-resistance. The theory was that the phosphate compound either broke down at high temperature to form phosphoric acid which combined with silica in the glass to form a silicate phosphate ceramic coating on or near the glass fiber or via formation of a high melting temperature phosphate surface coating or layer. It was also taught in this patent to add the phosphate to a binder solution normally used to coat the fibers and bond them together as a way of applying the phosphate compounds. Finally, this patent also taught a fire-resistant laminated fiber glass insulation product in which a nonwoven fiber glass mat, treated in accordance with that invention to make it fire-resistant, was laminated on each surface to a layer of fiber glass insulation blanket to make a fire-resistant insulation product.

U.S. Pat. No. 4,145,371 by Tohyama et al discloses a flame-retardant textile fiber consisting of PVA and an amino resin. The amino resin is a condensation product of formaldehyde with melamine and other amino compounds selected from urea, dicyandiamide and benzogranamine. The use of phosphorous additives is suggested to enhance the flame-retardant characteristics of the fiber. The addition of dicyandiamide was found to improve the color fastness of the fiber.

It is also known to use relatively large amounts of a phosphorus containing compound to produce a fire retardant condensate as taught by Goulding et al in U.S. Pat. No. 4,195,139. There a melamine-aldehyde is reacted with a relatively large amount of at least one oxyacid of phosphorous in a condensation reaction to form the fire retardant, the inorganic phosphorus compound being added in sufficient amounts that phosphorous is present in the resulting condensation product in the ratio of 0.4–1.7 moles of phosphorus for every mole of melamine.

After making the present invention and doing literature search to try to find out why and how the invention works, it was discovered that it is known to react urea and condensation products of urea with boric acid and boron oxide to produce boron nitride, as described by Podsiadlo and Gontarz in the POLISH JOURNAL OF CHEMISTRY, 58, 3 (1984) and Podsiadlo and Gorski in the POLISH JOURNAL OF CHEMISTRY, 58, 13, (1984). It is also know to react calcium, strontium and barium cyanamides with boric acids and boron oxide to form a boron nitride containing material as described by Podsialdlo and Orzel in the POLISH JOURNAL OF CHEMISTRY, 58, 323 (1984). However, each of these three articles, which are hereby incorporated by reference, reported only on the nature of the reactions and neither of the articles involved or suggested treating glass fibers, or other substrates, or making fire resistant glass fibers and glass fiber products using these reactions. Therefore, it is not known yet whether boron nitride is in fact being formed as a refractory sheath around the fibers making the fibers more fire resistant, but it is believed by the inventor that this is why the invention works.

It is known in the art to add boric acid to phenolformaldehyde resins to obtain reactions with the resin to achieve stronger bonds and to allow the resin to withstand higher temperatures before breaking down or decomposing. Thus, as disclosed in U.S. Pat. No. 4,480,068 (Santos), U.S. Pat. No. 4,176,105 (Miedaner) discloses that the temperature resistance of binders can be increased by the addition of boron compounds to modified phenolic resins, but attempts to employ borates in sufficient quantities needed to give the binder improved thermal resistance frequently result in resins having poor storage stability and poor tensile strength. The reason given was that the addition of larger amounts of boric acid disrupts, accelerates, the cure of the binder resulting in precure before the product the binder is in has been collected or molded, reducing the final strength of the bonds formed in the final cure. Santos taught adding an amide such as dicyandiamide and a pre-mixed boric acid-hydroxyl component to a urea modified phenol formaldehyde resin to permit the cured resin to withstand higher temperatures, but only up to 455 degrees C. (851 deg. F.). Santos only showed one binder containing over four percent boric acid and this sample showed reduced dry tensile and very poor wet tensile strengths. Santos did not teach or suggest that the binder of his invention would be fire resistant or that it would allow glass fiber products to withstand temperatures in excess of the softening or melting points of the glass fibers.

U.S. Pat. No. 3,218,279 (Stalego) taught punk resistant borated alkyd resin binders for glass fiber products in which a relatively small amount of phenol formaldehyde resin was also present, but the amounts of nitrogen compound and boron compounds in the binder were relatively low. There was no suggestion in this patent that the binder would protect the fibers in a fire or at temperatures above the softening and melting points of the glass fibers.

U.S. Pat. No. 2,990,307 taught using boric acid with phenol formaldehyde/melamine resins to bond glass fibers to give the product increased punk resistance, but only 2.5 percent boric acid is used and the product was only heated to 600 degrees F. There was no suggestion that the binder would protect the fibers in a fire or at temperatures above the softening and melting points of the glass fibers.

U.S. Pat. No. 4,095,010 taught using 0.5–2 percent boric acid as a cure accelerator, because of its low pH, in a phenolic resole resin fiber glass binder containing 5–15 percent urea or melamine. There was no suggestion that the binder would protect the fibers in a fire or at temperatures above the softening and melting points of the glass fibers.

U.S. Pat. No. 4,529,467 taught a thick, paste-like, epoxy resin based fire protecting intumescent composition containing a few percent of melamine and enough boric acid to produce a boron content of 0.1–10 percent. The purpose of the melamine was to produce a gas to cause the mastic to expand when exposed to fire. The composition could contain from 1–50 percent, based on the weight of the epoxy resin, curing agent and melamine, of fibrous reinforcements like chopped glass fiber to hold the composition together when it was heated by a fire to form a char. This composition also required the presence of zinc and phosphorous. A fiber glass mesh membrane could also be embedded in the mastic to hold the charred mastic together and on or around a steel member it was intended to protect. There was no suggestion that the mastic would protect the fibers at temperatures above the softening and melting points of the glass fibers and the highest temperature used for testing the compositions was 1000 degrees F. (538 degrees C.).

SUMMARY OF THE INVENTION

The present invention includes fire resistant glass fibers and fire resistant glass fiber products in which virgin glass fibers or commercially available continuous or chopped continuous glass fibers are coated and preferably bound together with a binder composition comprising a nitrogen containing compound and a boron containing compound, the boron containing compound being present in an amount of about 15–80 weight percent of the fire resistant glass fibers or product. Preferably, the boron containing compound is present in an amount exceeding 19 percent and most preferably exceeding 24 percent and being in the range of about 40–45 percent. The nitrogen containing compound is present in an amount of about 15–40 weight percent, and preferably about 20–30 weight percent of the fire resistant glass fibers or product. All percentages given herein are weight percent unless otherwise stated.

Virgin glass fibers are glass fibers having nothing or just water on their surfaces. Commercially available continuous glass fibers or chopped glass fibers usually have up to 1–2 wt. percent of a chemical sizing on the fibers to protect the fibers from abrasion. Sizing compositions are well known and the particular composition of the sizing is not critical to the invention.

The present invention includes fire resistant glass fibers comprising glass fibers having on their surfaces at least one nitrogen containing compound and at least one boron containing compound, said boron containing compound(s) being present in an amount of at least about 10 weight percent of said fire resistant glass fibers, said nitrogen containing compound(s) being present in sufficient amount to produce at least about one mol or atom of nitrogen for every mol or atom of boron that is in said boron containing compound(s), and wherein when said nitrogen containing compound is a nitrogen containing resin, said resin contains from none to no more than 1.5 weight percent, based on the weight of said resin, of a phosphorous compound as a curing catalyst, and wherein said glass fibers constitute at least about 10 wt. percent of said fire resistant glass fibers or product. Preferably, on this product and other products of the invention, the glass fibers constitute at least about 20 percent and most preferably at least about 25 percent, to as high as about 70 percent or so when only boric acid is used as the only boron containing compound, of the fire resistant glass fibers or product.

The present invention also includes a fire resistant glass fiber product comprised of glass fibers held together with a binder, said binder comprising at least one nitrogen containing compound, wherein when said nitrogen containing compound is a nitrogen containing resin, said resin containing from none to no more than 1.5 weight percent, based on the weight of said resin, of a phosphorous compound as a curing catalyst, said product also containing at least one boron containing compound in contact with said nitrogen containing compound, wherein said boron containing compound is present in amounts of at least about 10 weight percent of said fire resistant glass fiber product and wherein said nitrogen containing compound(s) is present in an amount to produce at least about one mol or atom of nitrogen for every mol or atom of boron that is in said boron containing compound, and wherein said glass fibers constitute at least 10 weight percent of said product. The preferred product is a fire resistant glass fiber nonwoven mat product containing about 28 percent glass fibers, about 29 percent urea formaldehyde resin and about 43 percent finely ground colemanite particles, preferably having at least 95% of the particles no larger than about 10 or 15 microns (when applied by curtain coating or spraying).

The present invention also includes a fire resistant insulation product comprising a blanket of insulation comprising glass fibers bonded together with a resin binder, said blanket having a nonwoven fiber glass mat embedded therein, the improvement comprising a fire resistant mat being said mat embedded in said blanket, said fire resistant mat comprising glass fibers held together with a binder, said binder comprising at least one nitrogen containing compound, wherein when said nitrogen containing compound is a nitrogen containing resin, said resin containing from none to no more than 1.5 weight percent, based on the weight of said resin, of a phosphorous compound as a curing catalyst, said product also containing at least one boron containing compound in contact with said nitrogen containing compound, wherein said boron containing compound is present in amounts of at least about 10 weight percent of said fire resistant glass fiber product and wherein said nitrogen containing compound(s) is present in an amount to produce at least about one mol or atom of nitrogen for every mol or atom of boron that is in said boron containing compound, and wherein said glass fibers constitute at least 10 weight percent of said product.

The present invention also includes a method of making a glass fiber product by attenuating molten glass into virgin glass fibers having a diameter below 40 microns and cooling said fiber to harden the glass, applying an aqueous binder to the fiber, collecting the fiber in a blanket and drying blanket and curing the binder to bond the fibers together to form a fiber glass product, the improvement comprising making a fire resistant fiber glass product by using as said binder an aqueous binder comprising at least one nitrogen containing compound and at least one boron containing compound and mixing and applying said binder such that said boron containing compound is on said virgin fibers in an amount of at least 10 weight percent, based on the weight of the virgin glass fibers, applying enough of said nitrogen containing compound on said glass fibers such that there is at least one mol or atom of nitrogen in said nitrogen containing compound around said glass fibers for each mol or atom of boron in said boron containing compound around said glass fibers, and wherein when said nitrogen containing compound is a nitrogen containing resin, said resin contains from none to no more than 1.5 weight percent, based on the weight of said resin, of a phosphorous compound as a curing catalyst.

The present invention also includes a method of making a fire resistant glass fiber mat comprising forming glass fibers into a nonwoven mat, coating the glass fibers with an aqueous binder mixture containing at least one nitrogen containing compound and coating the fibers with an aqueous mixture containing at least one boron containing compound, drying said mat and curing said binder, said mixture containing said boron containing compound being applied such as to apply at least 10 weight percent of boron containing compound, based on the weight of said glass fibers, on said glass fibers and applying enough of said nitrogen containing compound on said glass fibers such that there is at least one mol or atom of nitrogen in said nitrogen containing compound around said glass fibers for each mol or atom of boron in said boron containing compound around said glass fibers and wherein when said nitrogen containing compound is a nitrogen containing resin, said resin contains from none to no more than 1.5 weight percent, based on the weight of said resin, of a phosphorous compound as a curing catalyst.

The preferred boron containing compounds are compounds or materials like colemanite, ulexite and boric acid, but other boron containing compounds can be used. The preferred nitrogen containing compounds are melamine, ammonium chloride, melamine formaldehyde resin and urea formaldehyde resin, but other nitrogen containing compounds like urea, melamine modified phenol formaldehyde resin and amine containing epoxy resin can be used. The nitrogen containing compound is preferably also a binder, but where it is not a binder or resin, a small amount of a binder, preferably under 10 percent, but even under 5 percent can be used at times, based on the weight of the glass fibers, can be added to bond the fibers together. Any resin having no nitrogen or only a small amount of nitrogen commonly used to bond glass fibers, like polyester or acrylic resin can be used.

The boron compound can be in solution or in fine particles in suspension or in a fluid such as air or water, or in any combination of solution, powder or suspension. The boron compound can be applied by any known method of coating fibers individually or as a grouping of fibers such as is formed by spinners forming glass fibers from a melt, as a blanket of wool like glass fiber, as nonwoven mats, needled or unneedled, as bundles or strands of parallel fibers, or as woven fabrics, etc. When the non water soluble compounds are to be applied by spraying or curtain coating, fine particles are needed by the coating equipment, such as at least 95 weight percent of the particles below 200 mesh, preferably below 326 mesh and most preferably having diameters below 15 microns. When the compounds are to be applied by blowing or dusting dry powder onto the fibers or a fiber mass, then larger particles than 200 mesh are suitable and may be preferred, particularly for boric acid. Boric acid melts at a temperature less than the temperature at which the nitrogen is released by a nitrogen containing resin, and when the particles melt the melt spreads out along the surfaces of the fibers.

To make these glass fibers fire resistant and the glass fiber fire resistant products, after applying the boron containing compound(s) and the nitrogen containing compound(s), the fibers or fiber products are dried, and cured to set the binder, unless that was done prior to applying the boron compound. Preferably one or more boron containing compounds are mixed with one or more nitrogen containing compounds to make a sizing or binder and applied in well known ways of applying the sizing or binder, but either the boron compound or the nitrogen compound can be applied to the fiber first, such as by sizing, and then the other compound can be added later by dipping, spraying, curtain coating, powder coating, etc.

The boron containing compound is not intended to react with the nitrogen containing compound or nitrogen containing binder compound until the glass fiber product is put to use, such as in a building as insulation, a roofing product, etc., and until such reaction is needed as in a fire or other exposure to high temperatures. By high temperatures is meant temperatures high enough to decompose the nitrogen containing compound such as a nitrogen containing organic binder and release and provide nitrogen for reaction with the boron or boron oxide on the fibers to form boron nitride and/or mixtures of boron oxide and boron nitride. It is thought that this reaction results in a sheath of boron nitride around each fiber, and masses boron nitride around and between fibers at least at sites where the fibers cross over or are parallel to one another. It is also thought that these sheathes and/or masses support the individual fibers and hold the fiber products together, after the organic binder has decomposed and after the softening point temperature and probably the melting temperature of the glass fibers has been exceeded, to result in fire-resistant glass fiber products.

Many types of fire resistant glass fiber products are made by the above methods such as individual fibers, bundles of fibers, blankets and mats of flame attenuated including microfiber, rotary attenuated, chopped continuous glass fibers, yarn, rovings, scrim, woven fiber glass fabric, etc. Also, various combinations of these products such as laminated combinations of scrim or nonwoven mat and blanket insulation. These glass fiber products can also be used in combination with other materials to replace existing glass fiber products in a known manner to produce fire-resistant products, such as doors, ceilings and wall components, roof components, fire proof containers, etc.

Preferably the amount of boron, existing as boron, boron oxide or some other boron compound, present on the fiber at the time of the reaction with nitrogen is at least about one mol or atom of boron for each mol or atom of nitrogen. However, the amount of boron can be less than this ratio since some of the nitrogen will be lost before it reacts with the boron as the binder is decomposed by the high temperature.

DETAILED DESCRIPTION OF THE INVENTION

The present invention can be practiced in many ways as mentioned above and as will become more apparent below. For example, a known wet process for making fiber glass nonwoven mats is modified in accordance with the present invention to make mats that are fire-resistant compared to mats made with the conventional process.

Glass fibers used to make fiber products like nonwoven mats can have various fiber diameters and lengths depending on the strength and other properties desired in the product as is well known. It is preferred to use commercially available glass fibers having diameters in the range of 3 to 20 microns, most preferably 10 to 17 microns, such as G, K or M 117 wet chop E glass fibers available from Schuller International, Inc. of Denver, Colo. Normally the glass fibers used all have about the same length, such as 0.75+/−0.08 inch, but fibers of different lengths and diameters can also be used to get different characteristics in a known manner. Fibers up to about 3 inches in length can be used in a wet process for making fiber glass mats. Generally the longer the fiber, the higher the tensile and tear strengths of the mat, but the poorer the fiber dispersion.

Various glass compositions can be used to make glass fibers. Most often alumina borosilicate (E glass) or soda borosilicate (C type and insulation glasses) are used. Although the compositions and properties may vary with each of these glasses, typical softening point and maximum use temperatures are about 1320 degrees F. for C. glass and about 1530 degrees F. for E glass. Near or above these temperatures, glass fibers made from these glasses become to soft to maintain their integrity.

While many boron containing compounds and materials and nitrogen containing compounds and materials can be used, it is preferred that neither compound interfere with or degrade the normal strength and functions of the glass fiber and the organic protective coating and/or bond that the sizing or binder normally provide. Some variation in this preference is useful where the overall results obtained, including costs and processability, are more desirable. A preferred combination is particulate boric acid having a particle size of at least 98 percent being minus 200 mesh and fines added to a solution or suspension containing a nitrogen containing compound that will decompose to release nitrogen at a temperature below the softening point of the glass fiber, such as a material selected from the group consisting essentially of urea formaldehyde, urea, melamine formaldehyde, ammonium chloride, ammonium sulfate, and amine containing epoxy resins. This mixture applied to the glass fiber by spraying or dipping followed by drying and curing the binder.

Any known method of making nonwoven mats can be used. In a conventional wet laid process, as described in U.S. Pat. No. 4,112,174, the disclosure of which is incorporated here by reference, a slurry of glass fiber is made by adding glass fiber to a typical glass fiber nonwoven white water in a pulper to disperse the fiber in the white water forming a slurry having a fiber concentration of about 0.1 percent, metering said slurry into a flow of white water and depositing this mixture on to a moving screen forming wire to dewater and form a wet nonwoven fibrous mat. Alternative forming methods include the use of well known wet cylinder forming and "dry laying" using carding or random fiber distribution.

This wet nonwoven mat of glass fiber is then transferred to a second moving screen and run through a binder application saturating station where an aqueous binder solution, such as melamine formaldehyde resin based binder in water, is applied to the mat. This is followed by sucking off the excess binder and drying the unbonded, vet mat and curing (polymerizing) the melamine based resin binder bonding the fibers together in the mat. Preferably, the aqueous binder solution is applied using a curtain coater or a dip and squeeze applicator. In the drying and curing oven the mat is subjected to temperatures of 250–450 or 500 degrees F. for periods usually not exceeding 4 or 5 minutes to produce a cured, flexible, nonwoven fiber glass mat.

Melamine formaldehyde and urea formaldehyde resins are well known resinous materials. The composition of melamine formaldehyde resins and the various reaction mechanisms of the resins have been described in available literature. One reference entitled "Reaction Mechanism Melamine Resins" by Werner J. Blank, JOURNAL OF COATINGS TECHNOLOGY, Vol. 51, n.656, September 1979, pp. 61–70, discusses alkylated amino formaldehyde resins, which is hereby incorporated by reference. These resins contain substantial amounts of nitrogen in their structure and will serve both to bond the fibers together and to provide the amount of nitrogen required to form boron nitride sheaths around the fibers and bonds between the fibers. Other nitrogen containing resins that can be used are urea or melamine modified phenol formaldehyde, epoxy containing one or more amine modifiers, and other similar resins. Enough binder is put on the fibers to achieve a nitrogen containing resin concentration on the fibers of about 10–40 wt. percent, based on the weight of the fire resistant glass fibers or product.

It is sometimes preferred to use one or more non-resinous nitrogen containing compounds like melamine, ammonium chloride, urea or the like as the source of nitrogen—melamine is most preferred. When this is done, any resinous binder can be used, particularly those used with glass fibers, to bond the fibers, nitrogen compound and boron compound together. In these instances, usually 5–15 wt. percent binder, based on the weight of glass fibers, can be used, although higher binder levels can be used if more strength is desired.

The resins used in the present invention can contain catalytic amounts of a catalyst to speed curing or polymerization at elevated temperatures. However, more than catalytic amounts of most catalysts, such as phosphorus compounds, cannot be used because it would cause premature polymerization of the resin in storage or in the mat process prior to drying which would destroy the fiber bonding capability essential for the resin binder. For this reason, no more than 1.5 weight percent, based on the weight of the resin, of a phosphorus compound, such as a buffered phosphate, can be present in the aqueous resin solutions used in this invention or in contact with the resin on the glass fiber.

In the present invention a boron compound, preferably a calcium borate like colemanite and ulexite, with or with out boric acid, is added to an aqueous binder solution before the binder is applied to the glass fibers alone or in the nonwoven mat, paper or blanket or a woven fabric. Preferably about 20–35 weight percent binder solids, based on the weight of the fire resistant glass fibers or product, are on the glass fibers, but when only boric acid is used, the concentrations of boric acid can be as little as 10 weight percent of the fire resistant glass fibers or product with at least as much nitrogen containing compound like melamine formaldehyde resin. As little as 10 percent boric acid is marginally effective and practically the amount of boric acid should be at least 15 percent when it is the only boron containing compound used in the fire resistant product.

Boric acid is a preferred water soluble boron compound for adding to binder solutions and applying to the fibers as part of a binder because the acid nature of boric acid doesn't interfere with the curing of the melamine or urea formaldehyde resins. However, boric acid is soluble in water to only about a 5 percent concentration and this is not enough to satisfy the embodiments of the invention when boric acid is the only boron containing compound used. Consequently, it is preferred to use boric acid to supplement other boron compounds like colemanite, especially when the boric acid is to be applied with spraying or with a curtain coater. The particle size of the boric acid is important to the most effective application by these coating techniques. The preferred particle size of boric acid is smaller than minus 200 mesh, but boric acid is very difficult to grind to a particle size smaller than minus 200 mesh. Particle size is not critical, within reason, when applied by powder application techniques such as dusting, blowing, or sprinkling.

Other boron containing compounds can be used such as colemanite, ulexite, borax, polyborates, borohydrides, borohalides, ammonium borate and combinations thereof. When ammonium borate is used, it provides both boron and nitrogen. Preferably the boron compound is present in sufficient amount to produce about one mol of boron for each mol of nitrogen in the binder or nitrogen compound used on the fiber, but less boron is still very effective since some of the nitrogen will be lost at elevated temperatures before reacting with boron. It is economically undesirable to leave excessive boron on the fully reacted surface of the fiber, so it is desirable to use enough nitrogen containing compound to react with at least most of the boron on the fibers and in the bond network between the fibers.

A preferred non-soluble boron containing compound is colemanite, a calcium borate hydrate that exists naturally as a mineral. Colemanite contains about 25 weight percent chemical water in its structure. To use colemanite, it is preferred to grind to about a #7 Hegman grind, which produces a minus 15 micron to a minus 10 micron material, however coarser material up to at least minus 200 mesh can be used. These fine colemanite particles can then be made into an aqueous slurry having about 50% colemanite solids for adding to an aqueous binder solution of resin, preferably of melamine formaldehyde resin or raw melamine and urea formaldehyde resin. The mineral ulexite can be used in the same manner as colemanite.

The preferred mat compositions of the present invention are described in Table 1 below. The percentages in Table 1 are based on the total weight of the finished mat.

| Ingredient | Weight Percent | Preferred Wt. Percent |
| --- | --- | --- |
| Nitrogen compound | 15–40 | 20–30 |
| Boron compound (boric acid) | 0–25 | 5–20 |
| Boron compound (colemanite) | 15–80 | 15–50 (25–45 best) |
| Glass fibers | 10–70 | 20–50 |

Preferably, the binder is a melamine formaldehyde condensate polymer or urea formaldehyde resins commercially available. Such binders can be used with or without additional additives. Additives such as raw, pigments, defoamers, catalysts, plasticizers and processing aids, within the limitations defined herein, can be used. The melamine formaldehyde polymer may also be "fortified" with nitrogen containing compounds such as urea, melamine, dicyandiamide and guanidine.

EXAMPLE 1

A conventional nonwoven fiber glass mat was made in a known process as described in U.S. Pat. No. 4,112,174 by dispersing ¾ inch long, 10 micron diameter, E glass fibers in a conventional whitewater. The composition of the whitewater is not critical to the invention so any whitewater conventionally used to disperse glass fibers and form nonwoven mats will be suitable to the invention. After forming a well dispersed glass fiber stock in this manner, the stock was metered into a stream of the whitewater flowing in the whitewater loop upstream of the former and formed into a wet nonwoven web on a laboratory inclined wire former similar a Voith Hydraformer™.

The excess whitewater was sucked out of the mat and the wet mat was transferred to a curtain coater binder applicator where the mat was saturated with an unmodified urea formaldehyde resin in aqueous solution. The excess binder was sucked out of the mat and the mat was dried and heated to 360 degrees F. to cure the binder. The resultant mat had a basis weight of 3 pounds per 100 square feet, a glass fiber content of 80 percent and a binder content of 20 percent.

The conventional mat made as described above was subjected to a flame test employing a three inch by five inch mat sample. A one inch wide mouth Bunsen burner supplied a flame about 1.5 inch high using natural gas. The flame temperature was above 2000 degrees F. or higher. The mat sample was held horizontal in the flame about one inch above the top of the burner. The mat became cherry red (above 1400 degrees F.) in the area of the flame, but in 15 seconds or less samples of mat from this example developed a hole in the area of the flame, caused by melting of the fibers and first carbonization and then burn out of the binder, which hole expanded somewhat with additional time due to further melting and binder burn out. As this test shows, this mat is not fire resistant.

EXAMPLE 2

In this example a mat was made using the same procedure as disclosed in Example 1 above, except enough minus 200 mesh boric acid powder was added to the urea formaldehyde resin solution to produce a mat having a composition of 70 weight percent ¾ inch, 10 micron, E glass fiber, 15 percent unmodified urea formaldehyde binder and 15 percent boric acid, based on the weight of the dried and cured mat. The finished mat had a basis weight of 3 pounds per 100 square feet and physical properties similar to the mat made in Example 1.

When this mat vas tested as in the flame test described in Example 1 above, the mat went beyond cherry red to orange yellow (well over 1600 degrees F.) and remained visibly unchanged for at least 3 minutes before any melting was observed, and some samples didn't melt after a substantially longer test time. In view to this performance in this very severe test, this mat is considered to be flame resistant.

EXAMPLE 3

In this example the same procedure used in Example 2 was duplicated except that a melamine formaldehyde resin, Astromel CR-1, a trademark of Astro Industries, a division of Borden, Inc. for a low formaldehyde melamine resin, was used in place of the unmodified urea formaldehyde resin. The results of the flame test were the similar, possibly slightly better, as the mat made in Example 2.

EXAMPLE 4

In this example a mat was made using the same procedure used in Example 2, except that 13 micron diameter fiber was used instead of 10 micron diameter fiber and an aqueous binder slurry was made having a solids content of about 56 percent and containing about 40 wt. percent (dry basis) of the unmodified urea formaldehyde (UF) resin solids and about 60 wt. percent (dry basis) of #7 Hegman grind colemanite. The wet mat, formed as in Examples 1 and 2 was saturated with the binder slurry and enough slurry removed to produce a dry, cured mat having a 40 wt. percent loss on ignition and a composition of about 27.5 wt. percent glass fibers, about 43.5 wt. percent colemanite, and about 29 wt. percent UF resin solids. Thus the boron containing compound was present in this glass mat in an amount of about 158 percent of the glass fibers and the UF resin solids were present in an amount of about 105 percent of the glass fibers. This mat was flexible, had a basis weight of about 8.4 grams/square foot, a thickness of about 14 mils and a cross machine direction tensile strength of about 67 pounds on three inch wide test specimens. This mat showed better fire resistance than the mat of Example 2.

EXAMPLE 5

This mat was made exactly the same as the mat in Example 4, except the basis weight of the mat was increased to 19.6 grams per square foot which increased the thickness to 28 mils. This mat showed a loss on ignition of 38 percent and a cross machine tensile strength of about 168 pounds on three inch wide specimens. This mat showed as good or better fire resistance than the mat of Example 4.

EXAMPLE 6

When one inch long, 16 micron diameter, E glass fiber was used in place of the 13 micron diameter, ¾ inch long fiber, in the procedure described in Example 5 above, the mat basis weight remained about the same at 19.3 grams/square foot, the thickness increased to 31 mils and the cross machine remained the same. This mat had similar fire resistance as the mat made the same way except using the 13 micron fiber.

In practicing the present invention it is preferred to use as much boric acid as can be dissolved in the aqueous binder slurry, which is about 5 wt. percent of the water present, to provide a portion of the boron required for the product. When it is desired to use boric acid to provide still more boron, this can be accomplished by over spraying the mat with a dry powder or preferably, when working with a dry, cured mat, with an aqueous solution of boric acid.

Another application of the invention is to treat nitrogen compound coated glass fiber by spraying a boron compound containing solution, powder or suspension onto these fibers. For example, conventional melamine, urea, urea formaldehyde, or urea or melamine extended (modified or fortified) phenol formaldehyde bound nonwoven glass mats or blankets can be coated or first shredded or ground up to recover coated fibers or clumps of coated fibers. These fibers can be sprayed with a powder or solution of boric acid, sodium polyborate, or another soluble or partly soluble boron compound and then air laid and needled to form a fire resistant insulating blanket or powdered phenolic resin can be dusted onto the fibers and the blanket can heated to bond the fibers together. The shredded or otherwise recovered fibers can be carded and lapped, formed into a mat or blanket with a Rando Webber™ or a garnet wheel, with the boron compound applied either before or after these forming steps.

In still another embodiment of the invention, glass fiber can be coated with an aqueous sizing containing a soluble or partly soluble boron compound, such as boric acid and a conventional film former that will retain the boric acid on the surface of the wet fiber when it is used in the wet laid nonwoven process described above. A nitrogen containing binder like the binders described above is then applied to the boron compound nonwoven glass fiber mat in the conventional manner and dried and cured to form a fire resistant nonwoven mat.

In the known processes of making fiber glass insulation products, fine glass fiber is first formed from a melt by rotary fiberization, flame attenuation, etc. and then sprayed with an aqueous solution of a binder, typically phenol formaldehyde with urea or melamine extension (modification or fortification), melamine formaldehyde, or urea formaldehyde. The wetted fibers are then collected in a blanket on a permeable surface, compressed slightly or molded, dried and cured to form various fiberglass insulation products, like batts, blanket, pipe cover insulation, boards, ducts, etc. According to the present invention, a boron compound like boric acid, colemanite, etc. is added to the binder solution in amounts designed to react with most or all of the nitrogen in the binder to form fire resistant insulation products.

If urea is not used to extend the phenol formaldehyde binder typically used to bond insulation glass fibers together, i. e. to modify the binder by increasing, fortifying, its nitrogen content, then ammonium chloride or ammonium sulfate can be added to the binder solution to supply the nitrogen. Many other applications of the present invention will be apparent to those skilled in the art of glass fiber product manufacture after reading this specification.

This invention can also be used to increase the fire resistance of a previously manufactured or installed fiber glass product by spraying the surface of the product with an aqueous solution of a nitrogen containing binder or compound with a boron containing material like boric acid after the product is made or installed followed by drying. If the product is already bonded together with a nitrogen containing binder, then one need only spray the surface or surfaces with a solution, partial solution, suspension etc. containing a boron compound, e.g. boric acid and/or colemanite in water. Also, epoxy resins with an amine component can be used as a nitrogen containing compound and binder.

Normally the fiber glass products made according to this invention are processed and used in a conventional manner, i. e. the product is dried and heated only to cure the resin. The product is normally used before the boron compound fully decomposes and before the nitrogen containing compound decomposes to release nitrogen to react with the boron or boron oxide present on the fiber to form boron nitride or boron oxy nitride which protects the fiber and provides fire resistance during further heating. The heat required to produce these reactions normally comes from a fire in or on the structure in which the fiber glass product is installed. However, a further manufacturing step of heating the mat to a temperature high enough to decompose the nitrogen containing compound and to form boron nitride and/or boron oxy nitride on and between the glass fibers can be conducted. In this step the mat would be heated to a temperature usually above 1000 degrees F. by any suitable means, such as the apparatus described in U.S. Pat. No. 4,397,692, the disclosure of which is hereby incorporated by reference.

I claim:

1. A fire resistant glass fiber product comprised of glass fibers held together with a binder, said binder comprising at least one nitrogen containing compound, wherein when said nitrogen containing compound is a nitrogen containing resin, said resin containing from none to no more than 1.5 weight percent, based on the weight of said resin, of a phosphorous compound as a curing catalyst, said product also containing at least one boron containing compound in contact with said nitrogen containing compound, wherein said boron containing compound is present in amounts that would produce a boron content in the fiber glass product equivalent to what at least 15 wt. percent boric acid in the fiber glass product would produce and wherein said nitrogen containing compound(s) is present in an amount to produce at least about one mol or atom of nitrogen for every mol or atom of boron that is in said boron containing compound, and wherein said glass fibers constitute at least 20 weight percent of said product.

2. The fire resistant glass fiber product of claim 1 wherein said at least one nitrogen containing compound includes a binder selected from the group consisting of melamine formaldehyde, urea or melamine modified phenol formaldehyde, urea formaldehyde, amine containing epoxy resin and mixtures thereof.

3. The fire resistant glass fiber product of claim 2 wherein said at least one boron containing compound is a compound selected from the group consisting of boric acid, colemanite, ulexite, polyborates, borax, borohydrides, borohalides, and combinations thereof.

4. The fire resistant glass fiber product of claim 3 wherein said boron containing product comprises boric acid.

5. The fire resistant glass fiber product of claim 3 wherein said boron containing product comprises colemanite and/or ulexite.

6. The fire resistant glass fiber product of claim 4 wherein said boron containing product also comprises colemanite and/or ulexite.

7. The fire resistant glass fiber product of claim 3 wherein said at least one nitrogen containing compound and said at least one boron containing compound are intimately mixed together.

8. The fire resistant glass fiber product of claim 1 wherein said at least one nitrogen containing compound is in a layer next to the surfaces of the glass fibers and said at least one boron containing compound is on outer surfaces of said at least one nitrogen containing compound.

9. The fire resistant glass fiber product of claim 4 wherein said boric acid is on the surfaces of said glass fibers forming a layer and said at least one nitrogen containing compound is on outer surfaces of said layer.

10. The fire resistant glass fiber product of claim 1 wherein said glass fibers constitute at least about 50 weight percent of said product and wherein said product is a nonwoven glass fiber mat.

11. The fire resistant glass fiber product of claim 2 wherein said glass fibers constitute at least about 50 weight percent of said product and wherein said product is a nonwoven glass fiber mat.

12. The fire resistant glass fiber product of claim 3 wherein said glass fibers constitute at least about 50 weight percent of said product and wherein said product is a nonwoven glass fiber mat.

13. The fire resistant glass fiber product of claim 4 wherein said glass fibers constitute at least about 50 weight percent of said product and wherein said product is a nonwoven glass fiber mat.

14. The fire resistant glass fiber product of claim 5 wherein said glass fibers constitute at least about 50 weight percent of said product and wherein said product is a nonwoven glass fiber mat.

15. The fire resistant glass fiber product of claim 6 wherein said glass fibers constitute at least about 50 weight percent of said product and wherein said product is a nonwoven glass fiber mat.

16. The fire resistant glass fiber product of claim 7 wherein said glass fibers constitute at least about 50 weight percent of said product and wherein said product is a nonwoven glass fiber mat.

17. The fire resistant glass fiber product of claim 8 wherein said glass fibers constitute at least about 50 weight percent of said product and wherein said product is a nonwoven glass fiber mat.

18. The fire resistant glass fiber product of claim 9 wherein said glass fibers constitute at least about 50 weight percent of said product and wherein said product is a nonwoven glass fiber mat.

* * * * *